United States Patent [19]

Bergkvist, Jr. et al.

[11] Patent Number: 5,535,380

[45] Date of Patent: Jul. 9, 1996

[54] SYSTEM TO REDUCE LATENCY FOR REAL TIME INTERRUPTS

[75] Inventors: John J. Bergkvist, Jr., Williston, Vt.; Donald E. Carmon; Michael T. Vanover, both of Raleigh, N.C.

[73] Assignee: International Business Machines Corporation, Armonk, N.Y.

[21] Appl. No.: 357,888

[22] Filed: Dec. 16, 1994

[51] Int. Cl.⁶ .................................................... G06F 9/46
[52] U.S. Cl. ........................................... 395/550; 395/739
[58] Field of Search ............................ 395/550, 733–742

[56] References Cited

U.S. PATENT DOCUMENTS

| | | | |
|---|---|---|---|
| 4,099,255 | 7/1978 | Stanley et al. | 364/DIG. 2 |
| 4,344,133 | 8/1982 | Bruce, Jr. et al. | 364/DIG. 1 |
| 4,626,987 | 12/1986 | Renninger | 364/DIG. 1 |
| 4,638,452 | 1/1987 | Schultz et al. | 364/DIG. 2 |
| 5,239,641 | 8/1993 | Horst | 395/550 |
| 5,317,745 | 5/1994 | Chan | 395/700 |
| 5,414,858 | 5/1995 | Hoffman et al. | 364/DIG. 1 |

OTHER PUBLICATIONS

"Programmable Timer with Global Reset", L. Kleppe, IBM Tech. Dis. Bulletin, Vol. 28, No. 5, Oct. 1985.
"Method for Controlling the Hardware Level Zero Timer Value for an IBM PC Application", R. Grafe et al. IBM Tech. Dis. Bulletin, Vol. 29, No. 8, Jan. 1987.

Primary Examiner—Thomas M. Heckler
Attorney, Agent, or Firm—Perman & Green

[57] ABSTRACT

A system for providing a time-based interrupt signal to a processor for executing a real time interrupt event with reduced interrupt latency, involves: a first programmable counter, which is capable of interrupting the processor by generating an interrupt signal on a regular time period based on the decrementing of an initial count value loaded therein, which value is re-loaded in the counter when the count is exhausted and the interrupt signal is generated; one or more second programmable counters, also having initial count values loaded therein that are decremented, and each of which, if the count is exhausted before that of the first counter, will not allow certain types of instructions or events, respectively associated with each second counter, to execute, if the execution of such instructions or events would cause an unwanted latency in the interrupt caused by the interrupt signal from the first counter.

20 Claims, 6 Drawing Sheets

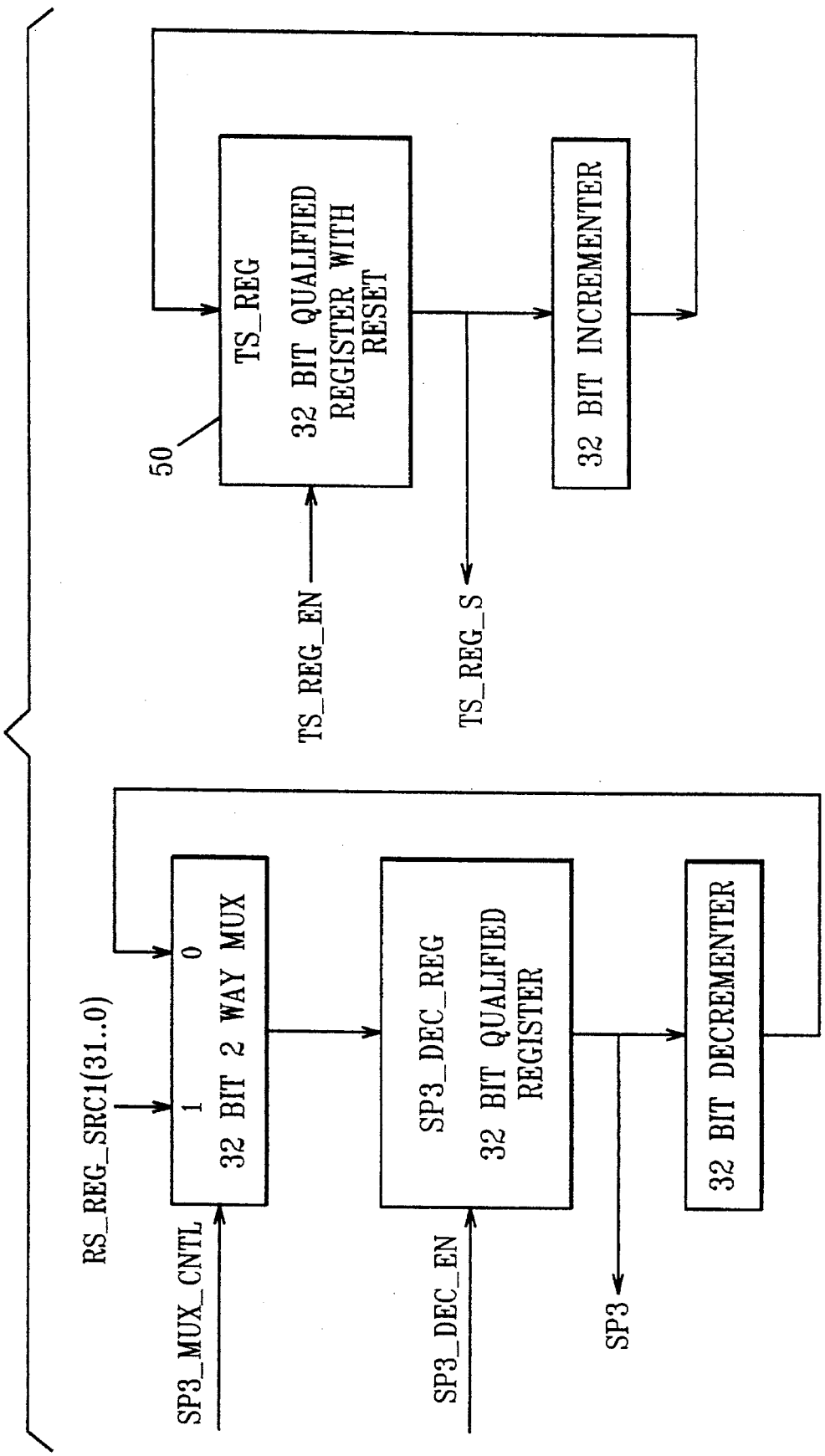

SYSTEM TO REDUCE LATENCY FOR REAL TIME INTERRUPTS

BACKGROUND OF THE INVENTION

1. Field of the Invention

The present invention relates to microprocessors and more particularly to a method and means for eliminating unwanted latency in the execution of interrupt signals which produce regular time period interrupts that allow tasks to be dispatched on a real-time periodic basis.

2. Problem to be Solved

In modern microprocessor systems, it is often necessary to provide the appearance of a real-time processor for certain system functions. An example is found in digital signal processor applications where there is a need for an interrupt mechanism for real time preemptive multi-tasking since it is required that tasks be dispatched on a real-time periodic basis. This is difficult to achieve due to the existence of certain functions that the microprocessor must perform that have unpredictable interrupt latency.

In conventional microprocessor implementations, instructions are executed through a module of code performing architected events. Each individual instruction may require several machine or other clock cycles to complete and the number of cycles required by each instruction may vary due to complexity, amount of data handled, resource required, Virtual to Real address translation, Cache hit or miss, and such. In modern microprocessors, performance is improved by using various methods that reduce the apparent number of cycles needed to execute the instructions, e.g., pipe-lining, branch guessing, out-of-order execution, multiple fetch and execution, etc. Further, outside influences, such as memory utilization, I/O utilization, exception handling, and the like, may cause a particular instruction to perform differently at different times.

From the foregoing, it will be appreciated that complex events effect the performance of an individual instruction as well as that of a module (group) of instructions. A problem is presented by this performance variation in certain applications where it is required to provide interrupt capability at precise intervals. With all the events effecting the performance of a microprocessor instruction stream it is clear that some events may severely impact the interrupt latency, for instance, when an instruction has an outstanding memory request that it cannot complete until the memory operation has completed. If the memory is not available, e.g., when another microprocessor has the current Line in a multi-processor environment, the instruction could be delayed in completion for a considerable time.

The functions that may add latency to an interrupt request being serviced vary by implementation and by type. It is therefore desirable that a system or mechanism be provided that eliminates the effect of various machine functions on latency and that preferably is programmable so that a system implementer can adjust for his particular requirements.

Objects

It is accordingly an object of the present invention to provide a method and means for eliminating the effect of various machine functions on latency in executing interrupt requests.

It is a further object of the invention to provide a method and means which eliminate the effect of various machine functions on latency in executing interrupt requests and which allow for programmability to permit adjustments for particular requirements.

SUMMARY OF THE INVENTION

The present invention involves a method and means that provide a programmable time-based interrupt which solves the latency problem through the use of the combination of a Real Time Interrupt Period (RTIP) register and one or more Safe Period Registers (SPRs) that control the execution of types or classes of events which must be suppressed in order to minimize the latency of servicing an interrupt on time. In the preferred embodiment, the RTIP register is set up with a programmable count for defining the interrupt period. The content value of the RTIP register determines the number of cycles, e.g., machine, processor, counter, or other clock iterations, until a Real Time Interrupt Event (RTIE), and this value count is loaded into a counter, e.g., a decrementer, which, when its value is exhausted, i.e., is equal to "0" or goes negative, generates an RTIE signal. The decrementer decrements on each machine or other clock cycle and the value of the RTIP register is re-loaded in the decrementer each time the decrementer reaches "0" and the RTIE signal is generated. In order to minimize the latency of servicing the RTIE, a set of Safe Period Registers (SPRs) are used, each of which contains a programmable value for a type or class of events the execution of which must be suppressed in order to minimize the latency of servicing an RTIE on time. The set of SPRs have the values of their contents loaded into decrementors that also decrement on each clock cycle. When an SPR decremented value goes less than "0", before an RTIE signal is generated, the associated class of operation is suppressed, allowing the RTIE to be serviced on time. The suppression is ended with the generation of the RTIE signal and the system recycles.

With this mechanism, a system programmer can set up the "Real Time" interrupt period in the RTIP register and set the SPR values such that as the Real Time Interrupt Event approaches, each system function that could effect the interrupt latency is suppressed, as required, to guarantee that the Real Time interruption can take place on time.

Other means for creating the suppression signal(s) may involve having a single counter (incrementer or decrementer) with registers containing a count value which, when surpassed by the counter, will assert the suppression and/or interrupt signal(s). In a case wherein there are three suppressible events, for instance, a count value is loaded into the RTIP register representing the count value that will initiate a real time interrupt, and each of the suppressible event counts is loaded into the respective SPR with a count value that will initiate the respective safe period.

In systems with multiple Real Time Interruption requirements, the system program can organize the RTIP register and the SPR's such that they are always counting down for the next Real Time Interrupt Event. Alternatively, multiple RTIP and SPR registers can be implemented, each protecting a different Real Time Interrupt Event period.

BRIEF DESCRIPTION OF THE DRAWINGS

FIG. 5 is a block diagram of a hardware implementation of a cycle counter protection register SP3_DEC_REG and a time stamp incrementer, TS_REG, of the invention.

FIG. 6 is a schematic of the logic circuitry which controls the real time interrupt data flow in accordance with the invention, wherein:

DETAILED DESCRIPTION OF THE INVENTION

Real time interrupt processing is accomplished in the preferred implementation to be described by providing a means to divide real time processes ($P_{RT}$) from non-real time processes ($P_{NRT}$). In order to accomplish this, a real time interrupt frequency or period ($P_{RTIP}$) must be established and maintained so that the real time interrupt will always be processed in an exactly periodic fashion. The first requirement to be able to do this is that a counter be able to produce a known, non-varying, periodic interrupt pulse. Further, the rate at which this real time interrupt frequency or period (RTIP) counter is updated must be able to be determined by software visible registers. It is also imperative that if this update rate changes, the real time operating system be informed of this change.

The other difficulty in being able to provide a periodic interrupt frequency is the problem of controlling interrupt latency. Interrupt latency is the condition which results when a pending interrupt may not be immediately serviced by its interrupt handler because the processor is busy finishing another previously started instruction. In order to circumvent the problem of interrupt latency, the present invention first groups events which cause interrupt latency into three areas, that is, 1) non-interruptable multicycle instructions, 2) non-real time software disabling interrupts, and 3) non-interruptable instructions from I/O devices on the external bus. Next, each of the three interrupt latency contributors are assigned a counter which is updated at the same rate that the real time interrupt frequency (RTIP) counter is updated. Each of the three counters are loaded by the real time operating system with values which guardband the worst case interrupt latency of its particular group and each disallows those events from occurring when the counter reaches a criterion point, e.g., becomes negative, thus operating as "safe period" registers (SPRs). By loading these "safe period" registers with values, $P_{SP0}$, $P_{SP1}$, and $P_{SP2}$, taking into account the start time of the next real time task, multiple real time interrupt frequencies can be handled with just one set of safe period registers (SPRs), while still minimizing interrupt latency and maximizing non-real time performance.

Figure 1:
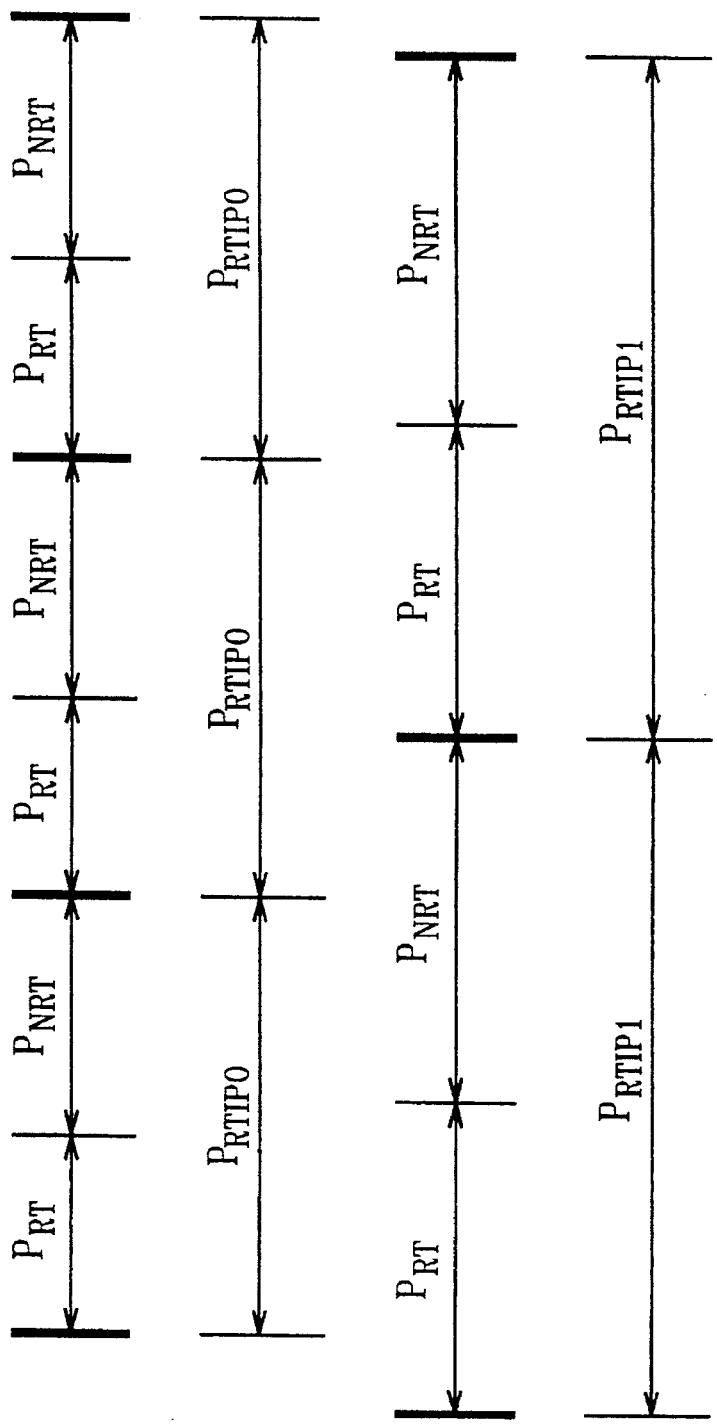
FIG. 1 is a diagrammatic illustration that depicts the concepts of the present invention with two independent real time interrupt frequencies or periods, $P_{RTIP0}$ and $P_{RTIP1}$.

FIG. 1 depicts the foregoing concepts for two RTIP counters, RTIP0 and RTIP1, with two independent real time interrupt frequencies, $P_{RTIP0}$ and $P_{RTIP1}$. For $P_{RTIP0}$ (the upper timing chart), there are three safe period counters, SP0, SP1, and SP2. Each counter provides a safe period by suppressing a class of events when it's associated countdown to 0 occurs. The safe period is represented by the shaded area for each safe period counter ($P_{SP0}$, $P_{SP1}$, $P_{SP2}$). For $P_{RTIP1}$ (the lower timing chart), the same function is supplied as for $P_{RTIP0}$. In this example, there are two independent real time interrupt event (RTIE) hardware mechanisms RTIP0 and RTIP1. However, the same function could be achieved with one set of hardware. For example, the interrupt software could keep track of the independent interrupt frequency requirement for RTIP0 and RTIP1 and initialize the hardware for the next sequential interrupt event following the occurrence of the present interrupt event.

Figure 2:
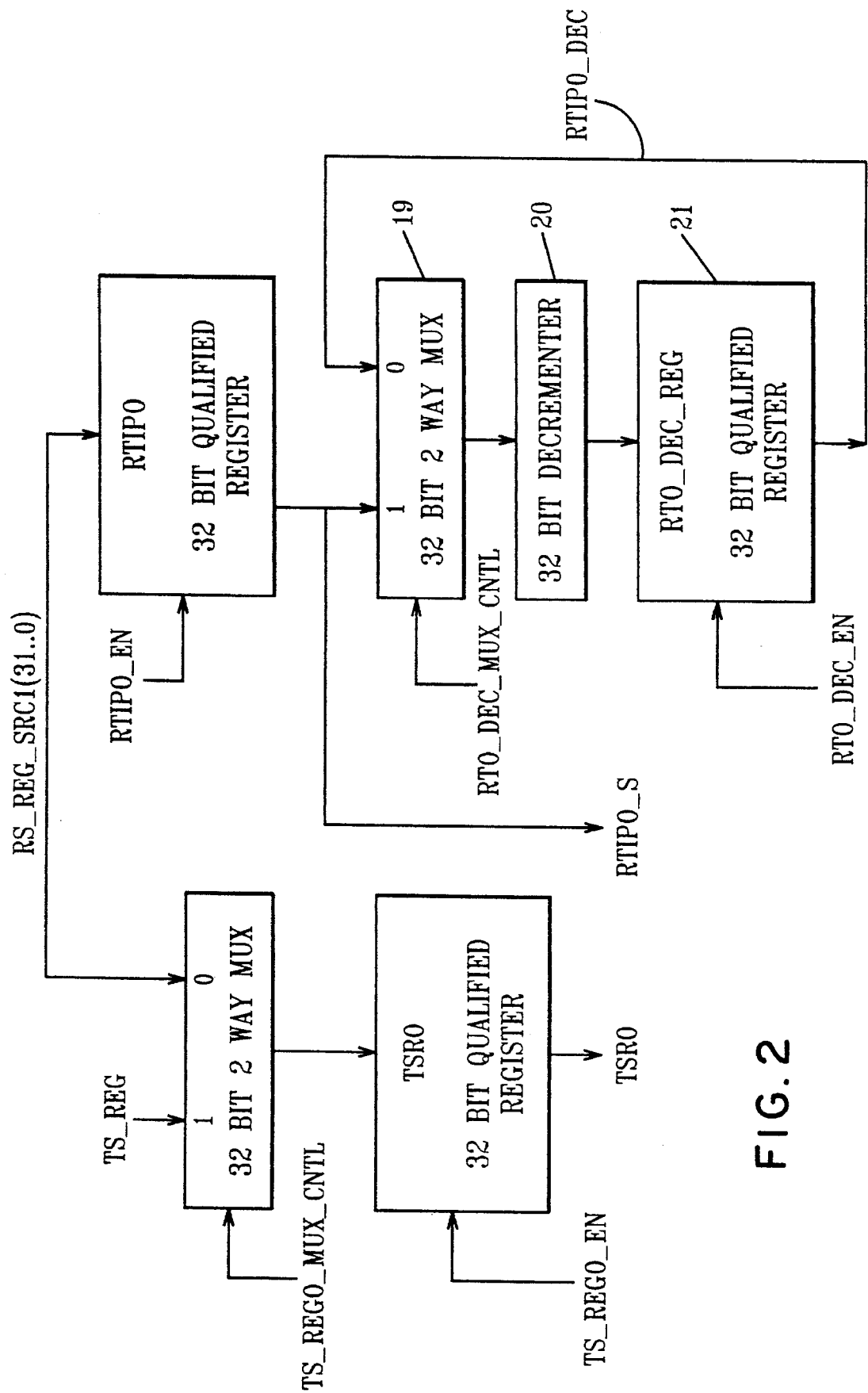
FIG. 2 is a block diagram of a preferred hardware implementation of an RTIP register, RTIP0, and associated components in accordance with the invention.
Figure 3:
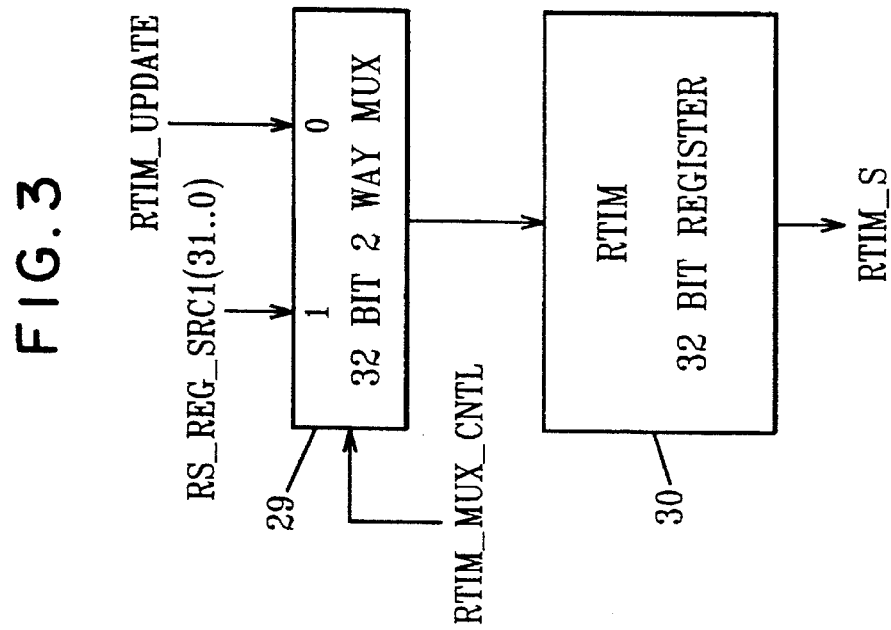
FIG. 3 is a block diagram of a hardware implementation of a real time interrupt mask and status register, RTIM, used in the invention.
Figure 6A:
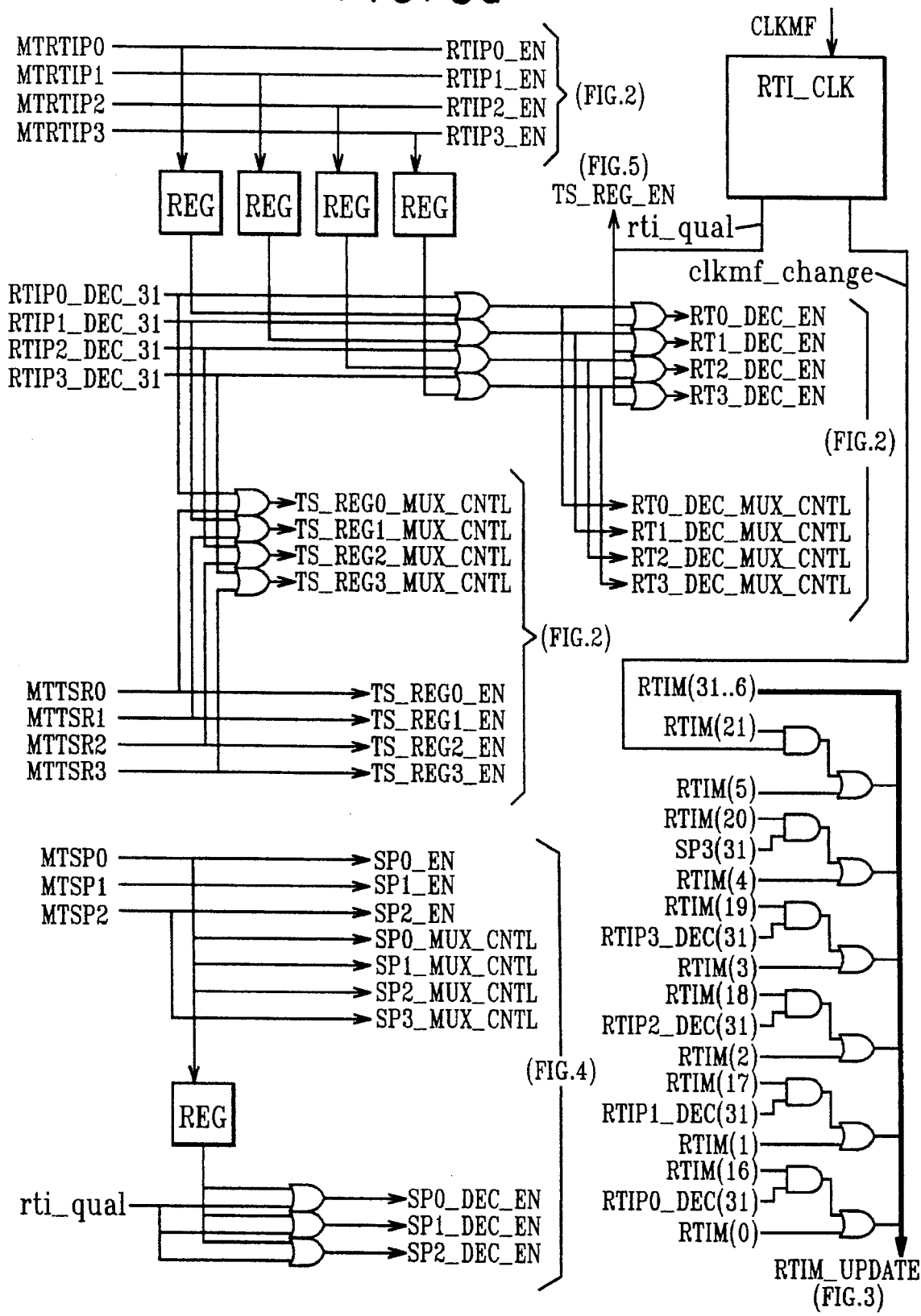
FIG. 6a illustrates the control logic for the RTIP registers, the SP registers, TS_REG, and RTIM update.
Figure 6B:
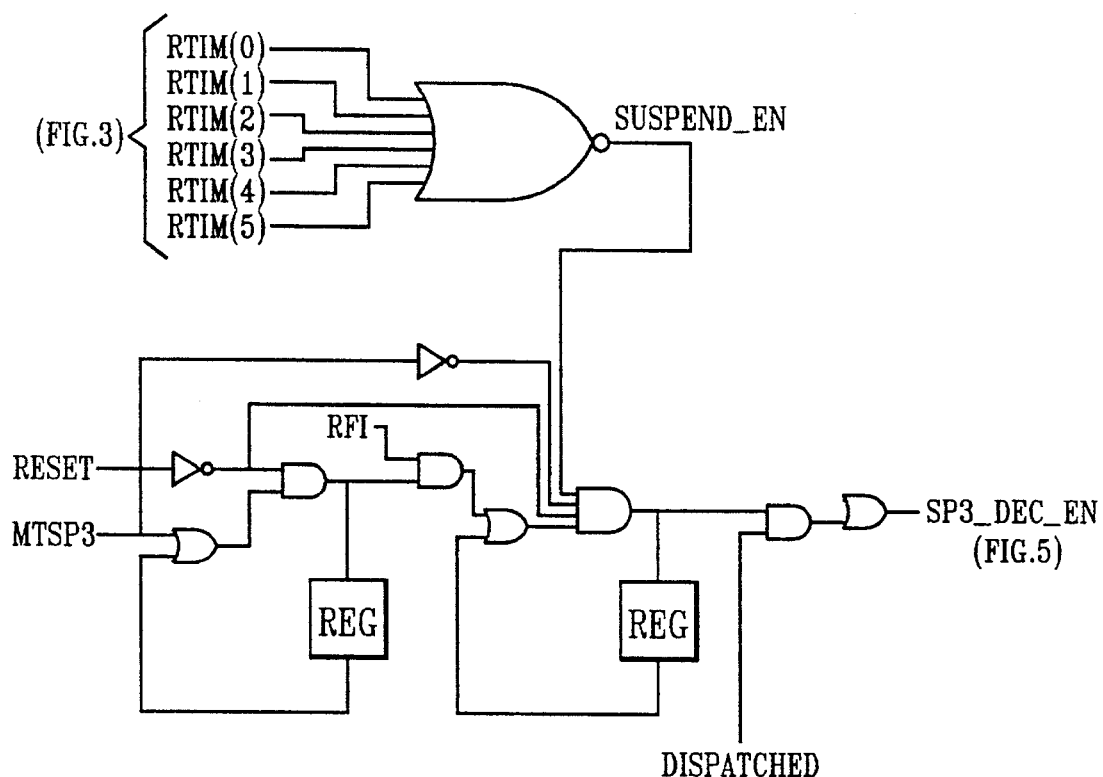
FIG. 6b illustrates the control logic for the enable signal to the SP3_DEC_REG of FIG. 5.
Figure 6C:
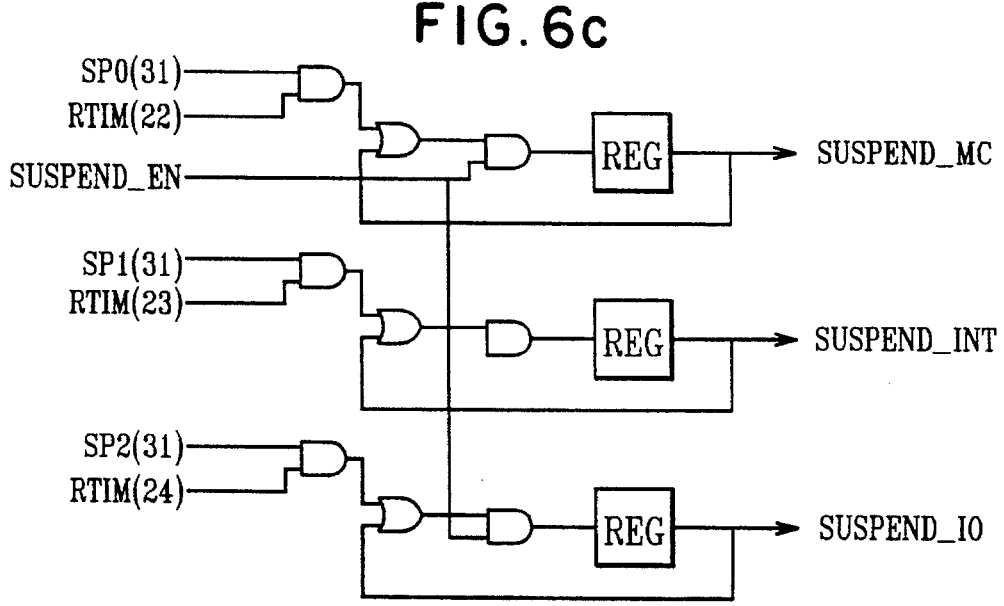
FIG. 6c illustrates the control logic for the SP registers and the RTIM register signals in producing SUSPEND signals.

The preferred implementation has the ability to support up to four independent real time interrupt frequencies so that four RTIP registers may be used. These registers may preferably be 32-bit registers, designated RTIP0–RTIP3. One register, RTIP0, of the four RTIP registers that contain the values that will be decremented at the external bus frequency to create the real time interrupt period, is shown in FIG. 2. Other convenient clock frequencies may also be used in incrementing or decrementing counters in the present implementation as may be alternatively selected by and will be within the purview of those skilled in the art. As seen in FIG. 2, an initializing signal, RTIP0_EN, enables register RTIP0 by latching to load a 32-bit signal, RS_REG_SRC1(31 . . . 0), from an external input bus, which input signal may contain appropriate count data supplied to the RTIP0 register from any of a number of general purpose registers within the processor. The value count in 32-bit register RTIP0 is then loaded, under the control of an RT0_DEC_MUX_CNTL signal through an appropriate multiplexer 19, into a 32-bit real time interrupt period decrementer 20 which decrements the count, in cooperation with a decrement register 21, on each processor cycle based on the external bus frequency. Decrement register 21 feeds back a count signal RTIP0_DEC to multiplexer 20 and when the decremented RTIP register value becomes exhausted or goes negative (MSB=1) then the real time interrupt period decrementer 20 gets reloaded from the RTIP0 register and continues to decrement. At the same time a 32-bit real time interrupt signal RTIP0_S is generated by RTIP0 and one bit thereof (31) is used in control logic (see FIG. 6a) in producing a signal, RTIM_UPDATE, that is passed, through an appropriate multiplexer 29, to a real time interrupt mask (RTIM) register 30 (see FIG. 3). The input signal is masked and latched in RTIM 30 and then various bits of the output signal RTIM_S are provided to the interrupt priority logic, as shown in FIGS. 6a, 6b, and 6c. Also when the decremented RTIP register value becomes negative, the contents TS_REG_S of a time stamp incrementer TS_REG 50 (see FIG. 5), a monitonically increasing 32-bit counter which is updated at the external bus frequency, is loaded (see FIG. 2) into a time stamp register TSR0, corresponding to the RTIP0 register, the decremented value of which went negative. There are four corresponding time stamp registers, in the form of 32-bit SPR's, denoted as TSR0–TSR3, for the four respective RTIP registers, RTIP0–RTIP3.

Figure 4:
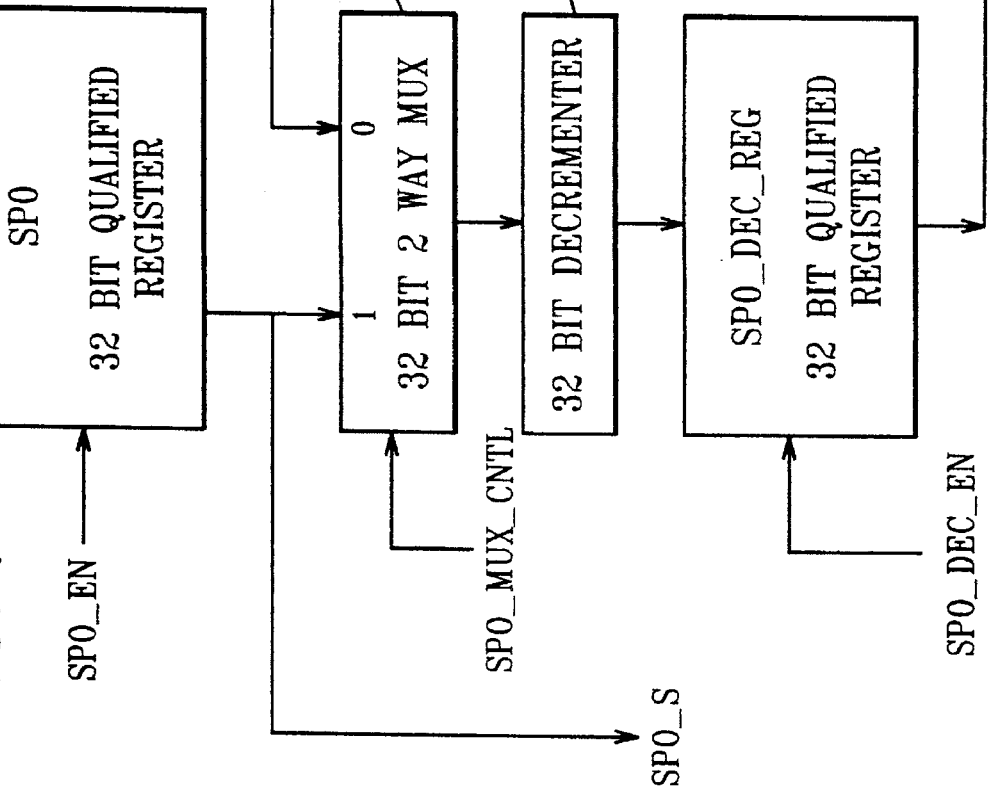
FIG. 4 is a block diagram of a hardware implementation of a safe period register, SP0, of the invention.

Each of the four RTIP registers, RTIP0–RTIP3, has an associated set of safe period registers (SPRs) for the three interrupt latency problem areas identified as SP0, SP1, and SP2. In particular, the safe period register for multicycle instructions is a 32-bit SPR indicated as SP0 (FIG. 4), the safe period register for software disabling interrupts is a 32-bit SPR indicated as SP1, and the safe period register for I/O instructions is a 32-bit SPR indicated as SP2. The contents of these three safe period SPRs are loaded from the input bus, in response to an enable signal, e.g., SP0_EN for SP0 (see FIG. 4), through appropriate multiplexers 39, into respective decrementers 40 when a move to signal, e.g., MTSP0 from a general purpose register source, occurs (see FIG. 6a). Each of the safe period registers, SP0, SP1, and SP2, has a decrementing register, e.g., SP0_DEC_REG, which operates in the same manner as the RTIP decrementing register RT0_DEC_REG, and when their decremented values become negative they generate output signals, e.g., SP0_S, a bit (31) of each of which is maskable via the RTIM register (see FIG. 6c), and produce respective suspend signals SUSPEND_MC, SUSPEND_INT, and SUSPEND_IO. These suspend signals then stop the appropriate instructions from being dispatched until the interrupt is cleared. They are cleared by the occurrence of any real time interrupt from RTIP0–RTIP3.

In order to insure that real time tasks only use a predefined amount of CPU resource, a mechanism is provided to generate an interrupt signal, SP3, after a programmable number of successfully dispatched cycles has occurred following the first return from interrupt (RFI) instruction after writing to a cycle counter protection SPR, SP3_DEC_REG (see FIGS. 5 and 6b). SP3_DEC_REG will be updated every internal CPU cycle in which at least one successful instruction is dispatched. It should be noted that dispatching an instruction does not mean that an instruction has been successfully executed and completed. This mechanism with the use of a microprocessor performance model can be used to determine the correct value to load in SP3_DEC_REG to ensure that the real time task is protected in the time domain.

One additional interrupt can be generated in the real time interrupt logic shown in FIG. 6a. This interrupt will occur whenever the internal clock multiplication factor (CLKMF) changes. The change will be input to a real time clock RTI_CLK which provides an output to the RTIM_UPDATE logic. The real time interrupt operating system will then have to query other SPR's in the preferred implementation to determine what the present clock multiplication factor is and make any insectary updates. All of the registers, REG, in FIG. 6 are single bit latches that delay the input signals by a single cycle.

It will accordingly be seen from the foregoing description taken with the drawings that a system is disclosed using multiple programmable counters for reducing latency time in executing computer instructions in response to interrupt or subroutine calls, and wherein memory with multiple memory locations may be employed for storing the multiple programmable counters. All of the registers, except the DEC registers and TS_REG, are architected registers, i.e., they are visible to a programmer for loading and unloading program data.

The programmable count registers include at least one such register for asserting the interrupt at a predetermined time consistent with the programmable count, and at least one other such register for suppressing events, as the interrupt time approaches, that may cause latency in responding to the interrupt.

These programmable count registers are initialized using software by means of which a programmer may load the count registers with predetermined values from memory each time a re-occurring programmable interrupt period is needed. As an example, the program user may set the required interrupt period into a first memory location. A program, as part of it's interrupt servicing routine may fetch the first memory location and algorithmically, calculate the appropriate count values. The program would then load the count values into the count registers to initiate a period of time after which, the hardware will interrupt the interrupt handler. After starting the period of time, the interrupt handler will return control of the processor to other programs. It should be noted, that the interrupt handler needs only to calculate the count values required once. The hardware, as described above, re-initializes the counts when they are exhausted such that the interrupt handler doesn't have to spend time re-calculating and loading count values. It should also be noted that multiple real-time event interruption periods can be had by either replicating the count hardware or having the interrupt handler, upon being interrupted, calculate the period required for the next to occur interrupt event.

What is claimed is:

1. A system for providing a time-based interrupt signal to a processor for executing a real time interrupt event with reduced interrupt latency, comprising:

first means for storing a first count value defining an interrupt period in terms of the number of count cycles until the time for executing a real time interrupt event;

first means for counting said count cycles and producing an interrupt signal when the cycle count reaches said number of count cycles defining an interrupt period, said interrupt signal indicating the time for executing a real time interrupt event;

second means for storing a second count value indicative of the number of count cycles until the time for executing a type or class of event which must be suppressed in order to minimize the latency of executing an associated real time interrupt event on time;

second means for counting said count cycles and producing an indicative signal when the cycle count reaches said number of count cycles indicating the time for executing said type or class of event; and means, responsive to said interrupt signal and said indicative signal, for suppressing the execution of any type or class of event to be suppressed when an indicative signal occurs before an associated interrupt signal for indicating the time for executing said real time interrupt event.

2. The system of claim 1 further comprising means for resetting said first and second means for counting each time an interrupt signal is produced.

3. The system of claim 1 wherein said first means for storing comprises means for programming said first count value and said second means for storing comprises means for programming said second count value.

4. The system of claim 1 further comprising a real time interrupt mask (RTIM) register means for masking and latching said interrupt signal.

5. The system of claim 4 further comprising clock means for sensing a change in the internal clock multiplication factor (CLKMF) and producing an output signal indicative thereof to said RTIM register means.

6. The system of claim 1 further comprising:

a time stamp register;

a time stamp incrementer updated on each cycle count; and means, responsive to the cycle count exceeding said number of count cycles defining an interrupt period, for loading the contents of said time stamp incrementer into said time stamp register.

7. The system of claim 1 further comprising: means for counting each count cycle at which a successful instruction is dispatched; and means for generating an interrupt signal after a programmable number of successfully dispatched cycles has been counted by said counting means.

8. Apparatus for providing a programmable time-based interrupt signal to a processor with reduced interrupt latency, comprising:

a Real Time Interrupt Period (RTIP) register means for storing a programmable count value defining an interrupt period in terms of the number of counter iterations until the time for executing a real time interrupt event;

first decrementer means, responsive to said stored programmable count value, for decrementing said count value on each counter iteration and producing an interrupt signal, when the decremented count value is exhausted, indicating the time for executing a real time interrupt event;

first means for resetting said first decrementer means to decrement said count value each time said decremented count value is exhausted;

at least one Safe Period Register (SPR) means for storing a programmable count value indicative of the number of counter iterations until the time for executing a type or class of event which must be suppressed in order to minimize the latency of executing an associated real time interrupt event on time;

second decrementer means, responsive to said stored programmable count value in said SPR means, for decrementing said count value and producing an indicative signal when the decremented count value is exhausted indicating the time for executing said type or class of event which must be suppressed;

second means for resetting said second decrementer means to decrement said count value each time said decremented count value is exhausted; and means, responsive to said interrupt and said indicative signals, for suppressing the execution of any type or class of event to be suppressed when an indicative signal occurs before an associated interrupt signal.

9. Apparatus as in claim 8 further comprising a real time interrupt mask (RTIM) register means for masking and latching said interrupt signal.

10. Apparatus as in claim 8 further comprising:

a time stamp register;

a time stamp incrementer updated on each counter iteration; and means, responsive to the decremented RTIP register means count value becoming negative, for loading the contents of said time stamp incrementer into said time stamp register.

11. Apparatus as in claim 8 further comprising:

means for counting each counter iteration at which a successful instruction is dispatched; and means for generating an interrupt signal after a programmable number of successfully dispatched cycles has been counted by said counting means.

12. A method for providing a programmable time-based interrupt signal to a processor for executing a real time interrupt event with reduced interrupt latency, comprising the steps of:

storing a first count value defining an interrupt period in terms of a number of clock cycles until the execution of a real time interrupt event;

decrementing said first count value on each clock cycle and producing an interrupt signal when the decremented value reaches a minimum indicating the time for the execution of a real time interrupt event;

storing a second count value indicative of a number of clock cycles until the execution of a type or class of event which must be suppressed in order to minimize the latency of executing an associated real time interrupt event on time;

decrementing said second count value on each clock cycle and producing an indicative signal when the decremented value reaches a minimum indicating the time for executing said type or class of event which must be suppressed; and sensing said interrupt and said indicative signals and suppressing the execution of any type or class of event to be suppressed when an indicative signal occurs before an associated interrupt signal.

13. The method of claim 12 wherein said first count value is programmable.

14. The method of claim 12 wherein said second count value is programmable.

15. The method of claim 12 further comprising the steps of repeating the decrementing of said first count value each time an interrupt signal is produced, and repeating the decrementing of said second count value each time an indicative signal is produced.

16. The method of claim 12 wherein said type or class of event which must be suppressed comprises non-interruptable multicycle instructions.

17. The method of claim 12 wherein said type or class of event which must be suppressed comprises non-real time software disabling interrupts.

18. The method of claim 12 wherein said type or class of event which must be suppressed comprises non-interruptable instructions from I/O devices on the external bus.

19. A system for providing a time-based interrupt signal to a processor for executing a real time interrupt event with reduced interrupt latency, comprising:

memory means for storing a first count value defining a time period, in terms of clock cycles, for the execution of a real time interrupt event;

means, responsive to said clock cycles, for producing a time-based interrrupt signal when said first count value time period passes;

memory means for storing a second count value defining a time period, in terms of clock cycles, for the execution of operations of a selected class;

means, responsive to said clock cycles, for producing an operations signal when said second count value time period passes; and means, responsive to said interrupt signal and said operations signal, for producing a signal suppressing the execution of operations of the selected class until said time-based interrupt signal is sent to the processor for the execution of a real time interrupt event, when said operations signal is defined to occur before said interrupt signal.

20. The system of claim 19 further comprising:

a real time interrupt mask (RTIM) register means for masking and latching said interrupt signal; and clock means for sensing a change in the internal clock multiplication factor (CLKMF) and producing an output signal indicative thereof to said RTIM register means.

* * * * *